United States Patent [19]

Ponant

[11] Patent Number: 4,555,270

[45] Date of Patent: Nov. 26, 1985

[54] BEET JUICE EXTRACTING PROCESS

[75] Inventor: Jacques Ponant, Paris, France

[73] Assignee: Union Nationale des Cooperatives Agricoles de Transformation de la Betterave, Paris, France

[21] Appl. No.: 605,803

[22] Filed: May 1, 1984

[51] Int. Cl.[4] .................... C12B 1/00

[52] U.S. Cl. .................... 127/44

[58] Field of Search .................... 127/44, 46.2; 426/429–431, 599, 271

[56] References Cited

U.S. PATENT DOCUMENTS 4,036,694 7/1977 Meguro et al. .................... 127/47

FOREIGN PATENT DOCUMENTS 515234 12/1952 Belgium .
817880 10/1951 Fed. Rep. of Germany .
895534 1/1945 France .
363476 12/1931 United Kingdom .

*Primary Examiner*—Ivars Cintins
*Attorney, Agent, or Firm*—Young & Thompson

[57] ABSTRACT

The beet juice extracting process, employing in particular diffusion, of the type comprising previously treating beets cut into cossettes with calcium ions, wherein the prior treatment is effected by treating the cossettes with an aqueous solution of calcium saccharate.

4 Claims, 1 Drawing Figure

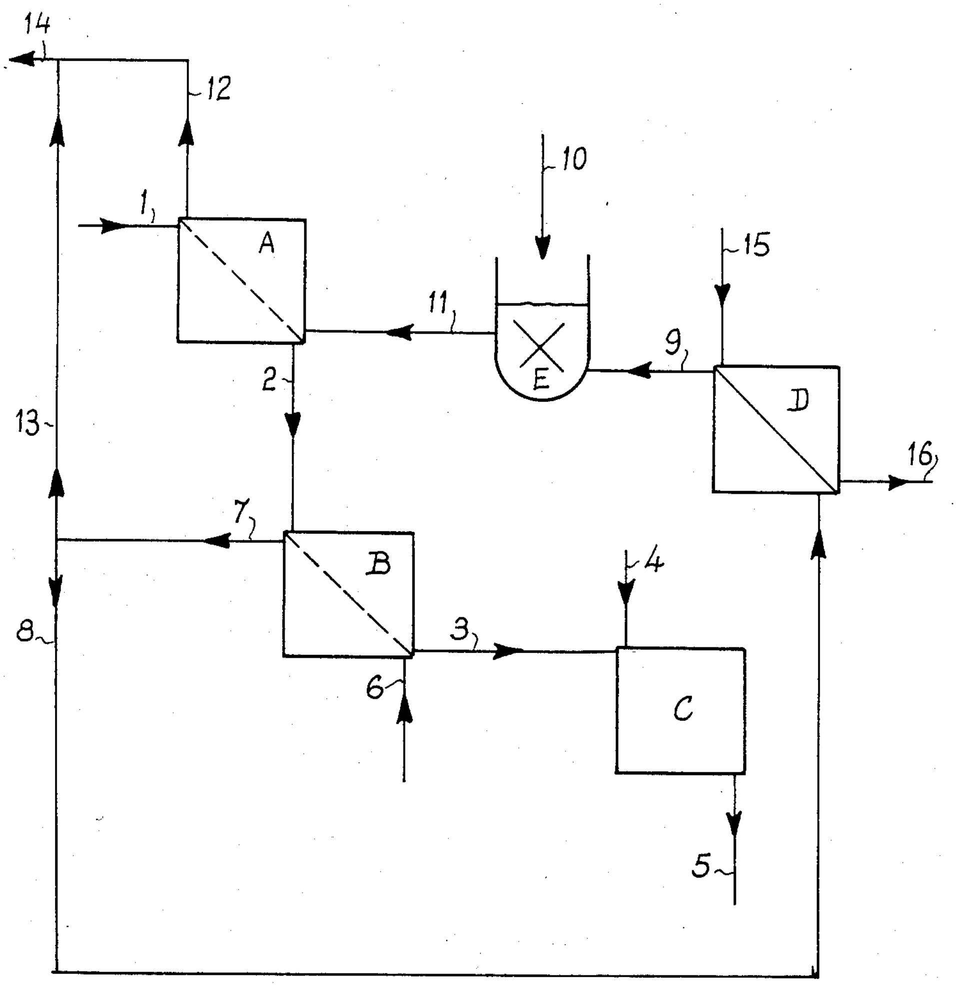
14
12
10
1
A
11
15
9
2
E
D
13
16
7
B
4
8
3
6
C
5

BEET JUICE EXTRACTING PROCESS

The present invention relates to a beet juice extracting process, in particular by diffusion.

Beet juice extracting processes which before employed pressure and now employ diffusion, give, with the juice containing the saccharose, impurities, and, in particular, pectic substances which, on the one hand, lower the purity and, on the other hand, render the subsequent filtrations more difficult.

This is why various researchers have sought to render the pectic substance insoluble. For this purpose, they have proposed effecting a prior treatment of the beets which are cut into cossettes by lime, usually in the form of milk-of-lime.

The pectic substances are linear polymers of galacturonic acid. A part of the carboxyl groups is methylated, a part of the hydroxyl groups is acetylated. When the pectic substances are limed, two reactions are obtained, first a hydrolysis of the esters with formation of methanol and acetate, and then a degradation of the glycoside bonds with decomposition of the polymer. When the temperature rises, the second type of reaction is favoured. On the other hand, if the temperature drops, it is the first reaction which predominates and an insoluble calcium pectate is obtained.

The prior technique comprised therefore either treating the beet cossettes with lime, generally in the form of milk-of-lime, or adding lime to the water used for extracting by diffusion.

These processes have had no success since, at the temperature employed for the action of the lime on the beet cellular juice, the OH- ions cut the glycoside bonds of the carboxylic groups and destroy the pectic chain. The degradation of the pectins favours the dissolution of the hemicellulose of the tissue which greatly reduces the rigidity of the cossettes, prevents the percolation of the extracting liquid and renders the subsequent pressing of the exhausted cossettes difficult.

An object of the present invention is to permit the fixing of the calcium ions on the galacturonic chains of the beet cut into cossettes, prior to the extracting operation, in particular by diffusion, without destroying the glycoside bonds.

The present invention therefore provides a beet juice extracting process employing in particular diffusion, of the type comprising previously treating the beets cut into cossettes with calcium ions, wherein said prior treatment is effected by a treatment of the cossettes with an aqueous solution of calcium saccharate.

The calcium saccharate may be calcium mono- or di-saccharate, provided it is soluble under the conditions of the reaction. In practice, the calcium monosaccharate is preferred.

The reaction may, in practice, be carried out at the temperature of 0° to 30° C. and, preferably, at a temperature lower than 15° C. Above this temperature, there is a risk of considerable decomposition of the calcium saccharate. But temperatures of 15° C. to 30° C. are possible if the extraction water employed contains a sufficient calcium content. Contents of 2,500 ppm of $CaSO_4$ of the extracting water thus permit operating with temperatures which range up to 30° C.

The aqueous solution of calcium saccharate may be obtained by dissolving the salt in the water. This solution contains advantageously 1 to 15% by weight of calcium saccharate.

However, in an advantageous manner of carrying out the process, the calcium saccharate solution is produced directly by the addition of quick lime or milk-of-lime to the diffusion juice.

The invention will be described in more detail hereinafter with reference to a drawing showing merely one manner of carrying out the invention.

In this drawing, the single FIGURE is a diagram of a plant for carrying out the process according to the present invention.

The diagrammatically illustrated plant shown in the FIGURE comprises a treating apparatus A. The beets cut into cossettes enter at 1 this apparatus which employs, for example, percolation and receives, at 11, a saccharated juice at a temperature lower than 15° C.

After reaction and fixing of the calcium, the cossettes leave the apparatus at 2 and are heated in a heat exchanger B, for example employing a percolation by means of diffusion juices at 70° C. entering at 6. The cossettes which leave the exchanger B at 3 are sent to a scalding-tub C which receives at 4 a scalding juice (diffusion juice taken from the process and previously reheated). The juice-cossette mixture heated to 70° C. leaves the scalding-tub C at 5 and is sent to an extracting apparatus employing diffusion (not shown) where the diffusion is carried out during 50 to 80 minutes.

The pulps issuing from the extracting apparatus employing diffusion are subjected to a conventional pressing, for example by means of screw presses, which brings the dry substance content of the pulps to more than 40%.

A part of the juice drawn off at 7 from the exchanger B is conveyed, at 8, to a heat exchanger D where the juice is cooled to 4° C. by ice water entering at 15 and leaving the exchanger at 16.

The cooled juice issuing from the exchanger D at 9 is introduced in a reactor E in which powdered quick lime is also introduced at 10. The duration of the reaction is about 10 minutes. The saccharated juice which issues at 11 is sent to the apparatus A, as indicated before.

The juice issuing at 12 from the treating apparatus A and the remainder of the juice discharged at 13, which is not taken from the exchanger B for the preparation of the saccharated juice are united at 14 and recovered.

By way of example, there are introduced into the treating apparatus A, at 1, 1,000 kgs of cossettes at 10° C. and, at 11, 227 kgs of saccharated juice at 10° C. (pH=12.6).

1,100 kgs of calcic cossettes at 10° C. are obtained at 2 and introduced into the exchanger B. There are sent to the exchanger B, at 6, 1,413 kgs of diffusion juice at 70° C.

1,220 kgs of calcic cossettes at 54° C. are obtained at 3 and introduced into the scalding-tub C with 2,425 kgs of scalding juice at 75° C. 3,645 kgs of a juice/cossette mixture at 70° C. are conveyed at 5 to the diffusion extraction apparatus.

Issuing from the exchanger B are 1,313 kgs of diffusion juice cooled to 33° C., 220 kgs of which are sent at 8 to the exchanger D. After cooling to 4° C., the 220 kgs of diffusion juice are added to 7 kgs of powdered quick lime at 10° C. in the reactor E.

After reaction and treatment in the treating apparatus A, there are discharged at 12,127 kgs of potassic juice (after exchange of potassium ions with the calcium ions). A total of 1,220 kgs of juice are drawn off at 14.

The process according to the invention permits an improvement in the purity of the extraction juices, a reduced extracting time (of the order of 20% reduction) and an improved filtrability of the juices.

The process according to the invention moreover permits an improvement in the pressing conditions of the exhausted pulps, owing to the more rigid texture imparted by the fixation of the calcium ions. Thus, it is possible to obtain, by means of the process according to the invention, pressed pulps having a content of dry substances of more than 40%, whereas the conventional processes permit the obtainment of pulps having, at the most, dry substance contents of 27 to 28%. The process according to the invention therefore results in very considerable savings in energy.

What is claimed is:

1. In a beet juice extracting process comprising first treating beets cut into cossettes with calcium ions and then extracting beet juice, the improvement wherein said first treatment is effected by treatment of the cossettes with an aqueous solution of calcium saccharate at a temperature lower than 15° C.

2. A process as claimed in claim 1, wherein the calcium saccharate is calcium monosaccharate.

3. A process as claimed in claim 1, wherein said aqueous solution contains 1 to 15% by weight of calcium saccharate.

4. A process as claimed in claim 1, wherein said aqueous solution is obtained by adding quick lime to a diffusion juice.

* * * * *